United States Patent
Neubert

(10) Patent No.: US 8,048,248 B2
(45) Date of Patent: Nov. 1, 2011

(54) METHOD OF AND APPARATUS FOR WINDING A FIBER STRAND ONTO A BOBBIN

(75) Inventor: Mike Neubert, Steffenberg (DE)

(73) Assignee: EHA Spezialmaschinenbau GmbH, Steffenberg (DE)

( * ) Notice: Subject to any disclaimer, the term of this patent is extended or adjusted under 35 U.S.C. 154(b) by 825 days.

(21) Appl. No.: 12/061,826

(22) Filed: Apr. 3, 2008

(65) Prior Publication Data

US 2008/0251620 A1  Oct. 16, 2008

(30) Foreign Application Priority Data

Apr. 3, 2007 (EP) ..................................... 07006913

(51) Int. Cl.
*B65H 81/00* (2006.01)
(52) U.S. Cl. ......... 156/169; 156/173; 156/175; 156/425
(58) Field of Classification Search .................. 156/169, 156/173, 175, 166, 425
See application file for complete search history.

(56) References Cited

U.S. PATENT DOCUMENTS

| | | | | |
|---|---|---|---|---|
| 4,288,267 A | * | 9/1981 | McLarty | ........................ 156/175 |
| 4,790,898 A | * | 12/1988 | Woods | ........................... 156/166 |
| 6,601,793 B2 | * | 8/2003 | Yasui et al. | ................. 242/472.8 |
| 2005/0184188 A1 | * | 8/2005 | Weg | ................................ 156/172 |
| 2005/0193775 A1 | | 9/2005 | Neubert et al. | .................. 65/408 |

FOREIGN PATENT DOCUMENTS

| | | | |
|---|---|---|---|
| DE | 2706453 A1 | * | 8/1978 |
| WO | WO-2004035297 | | 4/2004 |

* cited by examiner

*Primary Examiner* — Jeff Aftergut
(74) *Attorney, Agent, or Firm* — Andrew Wilford

(57) ABSTRACT

An apparatus for winding a fiber strand onto a bobbin having a longitudinal axis has a support holding the bobbin for rotation about the axis, a supply for feeding the fiber strand in a travel direction generally radially or tangentially to the bobbin, and a drive for rotating the bobbin about the longitudinal axis and for, when a fiber strand is engaged with the bobbin, winding the fiber strand onto the bobbin. A handling device is rotatable about the axis adjacent the bobbin and carries a strand layer for at a start of a winding operation moving into a predetermined angular position and pressing a leading end of the fiber strand against the bobbin. The handler also carries a cutter on the handling device for at an end of a winding operation cutting the fiber strand and thereby forming a trailing end attached to the bobbin and a new leading end.

12 Claims, 12 Drawing Sheets

METHOD OF AND APPARATUS FOR WINDING A FIBER STRAND ONTO A BOBBIN

FIELD OF THE INVENTION

The present invention relates to winding a fiber strand or yarn onto a support or bobbin. More particularly this invention concerns a method and apparatus for winding a fiber strand or yarn onto a support or bobbin.

BACKGROUND OF THE INVENTION

Variously designed apparatuses of the above-described type are known from practice. With such an apparatus, one tries to wind a fiber strand onto a bobbin as rapidly as possible. However, increasing winding rates frequently require sacrificing the reliability of winding operations. Many of the known apparatuses thus leave much to be desired, in terms of both winding rates and the reliability of winding operations. Special problems arise when winding fiber strands that have been impregnated with a fusible thermoplastic, in which case, both the problem of reliably winding the ends of fiber strands onto bobbins and the problem of handling the ends of fiber strands remaining on bobbins following termination of winding operations and conduct of cutting operations arise, where the hardened ends of fiber strands will have to be remelted and subsequently ironed either onto bobbins or fiber strands that have been wound onto them, using elaborate ironing devices, is known. Cutting off and removing the ends of fiber strands is also known. However, cutting off waste and disposal thereof are also complex matters. Many disadvantages of the known apparatuses are also due to the belief that fiber strands must be continuously fed, without interruption, when winding them onto several bobbins in succession. The apparatuses known from actual practice are thus in need of improvement.

OBJECTS OF THE INVENTION

It is therefore an object of the present invention to provide an improved method of and apparatus for winding a fiber strand onto a bobbin.

Another object is the provision of such an improved method of and apparatus for winding a fiber strand onto a bobbin that overcomes the above-given disadvantages, in particular that is very fast, that can deal with fusible strands or yarns, and that allows the strand or yarn to be fed virtually continuously.

SUMMARY OF THE INVENTION

An apparatus for winding a fiber strand onto a bobbin having a longitudinal axis has according to the invention a support holding the bobbin for rotation about the axis, a supply for feeding the fiber strand in a travel direction generally radially or tangentially to the bobbin, and a drive for rotating the bobbin about the longitudinal axis and for, when a fiber strand is engaged with the bobbin, winding the fiber strand onto the bobbin. A handling device is rotatable about the axis adjacent the bobbin and carries a strand layer for at a start of a winding operation moving into a predetermined angular position and pressing a leading end of the fiber strand against the bobbin. The handler also carries a cutter on the handling device for at an end of a winding operation cutting the fiber strand and thereby forming a trailing end attached to the bobbin and a new leading end.

In other words the invention is an apparatus for winding a fiber strand onto at least one bobbin where the bobbin is rotatable about its longitudinal axis while the fiber strand is wound thereon. A handling device is rotatable about the bobbin's longitudinal axis is provided on the bobbin and can is rotate to a start-winding position in which an end of a fiber strand fed to it may be wound onto the bobbin using the handling device at the start of winding operations, and the handling device is rotatable to a cutting position in which the fiber strand may be cut by a cutter upon termination of winding operations.

It lies within the scope of the invention that the bobbins according to the invention have round or circular cross-sections. It will be beneficial if the bobbins involved are either cylindrical or have essentially cylindrical shapes, where, in particular, the ends, or the surfaces of the ends, of the cylindrical carriers may be rounded. According to a preferred embodiment of the invention, plastic liners or containers are employed as bobbins. According to a further preferred embodiment, metallic liners or metallic containers are employed as bobbins.

The apparatus according to the invention is particularly well suited for winding a fiber strand that has been impregnated with a liquid medium or sizing that, in particular, dries or hardens after a certain period. That the apparatus is primarily intended for winding a fiber strand composed of fibers impregnated with a fusible thermoplastic is also within the scope of the invention. According to a preferred embodiment, the fiber strand consists of a mixture of fibers, at least one of which consists of a fusible thermoplastic. This thermoplastic component will be melted prior to being wound onto the bobbin but the other nonthermoplastic components of the fiber mixture will not be melted. According to a preferred embodiment, the fiber mixture is a mixture of glass fibers and fusible, thermoplastic fibers. However, the invention may generally also be used for winding preimpregnated fiber strands (prepregs) onto bobbins, in which case, melting will not be necessary.

A particularly preferred embodiment of the invention is characterized by the fact that a heater arranged upstream in the yarn-travel direction of the bobbin onto which the fiber strand is to be wound is provided for melting the thermoplastic. The heater might, for example, be an infrared heater. It will be beneficial if the thermoplastic of the fiber strand is melted shortly before, or while the fiber strand is wound onto the bobbin in order that the fiber strand and fusible thermoplastic will be wound onto the bobbin. The fusible thermoplastic will usually harden fairly rapidly. It is preferred when the thermoplastic melted by the heater is mechanically worked into the strand's fibers, where the fiber strand might be guided over rollers or studs that cause the fusible thermoplastic to be worked into the fiber strand, for that purpose.

It lies within the scope of the invention to provide a laying device, with which the fiber strand to be wound onto a bobbin may be transported or fed to the bobbin onto which it is to be wound. It will be beneficial if the fiber strand is continuously fed when winding is started and while it is being wound onto a bobbin. According to a highly preferable embodiment of the invention, a brake that is preferably arranged upstream in the travel direction of the fiber strand of the laying device, and with which the fiber strand may be firmly clamped, is provided. The firm clamping of the fiber strand in the brake will at least temporarily interrupt the continuous feeding of the fiber strand. It will be beneficial if the fiber strand is firmly clamped to a bobbin in conjunction with the termination of winding operations or firmly clamped in the brake in conjunction with the cutting of the fiber strand using a cutter, which will prevent the cut fiber strand from slipping backward out of the laying device toward the heater. The solid clamping in the brake and the interruption of the continuous feeding of the fiber strand will be described in greater detail below. The heater described above is preferably arranged upstream relative to the travel direction of the fiber strand of the brake, and is preferably provided upstream of the assembly consisting of the brake and the laying device.

According to a particularly preferred embodiment of the invention, the handling device has a gripping roller with which the leading end of the fiber strand to be wound onto a bobbin may be pressed against the bobbin while the handling device is at the start-winding position. It will be beneficial if the end of the fiber strand held in the laying device is initially straightened by the gripping roller. The gripping roller is then preferably rolled over the straightened end of the fiber strand and the end of the fiber strand is pressed against the bobbin by the gripping roller. According to the invention the rotation of the bobbin and handling device are synchronous during the first turn or so of winding of the fiber strand onto the bobbin, as well as the simultaneous pressing of the end of the fiber strand against the bobbin by the gripping roller attached to the handling device. As used here, "synchronous rotation" means that the bobbin and handling device both rotate in the same direction, and at the same angular speed. The gripping roller attached to the handling device presses the end of the fiber strand against the bobbin during that synchronous rotation, and the gripping roller is preferably rotatable in just one direction in order that the end of the fiber strand beneath cannot slip out of the gripper roller's range due to the gripping roller reversing its direction of rotation. It will be beneficial if a one-way clutch prevents the gripping roller from rotating in the undesired, opposite direction. The handling device preferably has at least two gripping rollers, preferably mounted diametrically opposite each other with respect to the circumference of the bobbin. It is preferred that the bobbin and handling device rotate synchronously during the initiation of a winding operation and then continue to rotate synchronously, preferably over at least a full rotation of the bobbin.

Once a winding operation have been started, according to a preferred embodiment, the handling device is shifted to a parked position in which it does not rotate and is out of contact with the bobbin and the strand wound thereon. While at the parked position, the gripping roller, or gripping rollers, are preferably not in contact with either the end of the fiber strand or the fiber strand, nor brought into contact with the bobbin. It will be convenient if one gripping roller is attached to a pivoted arm, with which it may be swung away from the bobbin.

Winding during which the handling device preferably remains at the parked position without rotating follow the start of winding. During a winding operation the fiber strand is continuously wound onto the bobbin, preferably proceeding from one end of the bobbin to the other end thereof, and back again. A uniform, spiral winding of the fiber strand from one end of the bobbin to its other end takes place. The winding from one end thereof to the opposite end thereof and back again may be repeated numerous times during winding operations. It should be pointed out that according to a very highly preferred embodiment of the invention, the fiber strand is either constantly being impregnated with a liquid substance or constantly being impregnated or coated with the fusible thermoplastic, both during the initiation of winding operations and during winding operations. It will be beneficial if the fusible thermoplastic is continuously melted in the heater arranged prior to, referred to the travel direction, the bobbin, and the fiber strand and thermoplastic fused thereon are continuously fed to the bobbin during both the initiation of winding operations and the subsequent winding operations. It is preferred that the bobbin rotate in the same direction, and preferably at a constant rotation rate, during both the initiation of winding operations and the winding operations that follow.

Upon termination of winding operations, the handling device is rotated to the cutting position, preferably from the above-described parked position. It lies within the scope of the invention that the rotation of the bobbin is stopped prior to cutting the fiber strand using the cutter. In the cutting position, a gripping roller is pressed against the fiber strand and the fiber strand is cut by the cutter. It will be beneficial if, in conjunction with the cutting operation, or prior to the cutting operation, the fiber strand is clamped in the brake, which is preferably arranged upstream in the travel direction of the fiber strand of the laying device. The solid clamping of the fiber strand will prevent the end of the fiber strand from slipping out of the laying device, toward the brake or heater. Continuous feeding of the fiber strand will be interrupted while the fiber strand is clamped.

Also within the scope of the invention is the attachment of the cutter used for cutting the fiber strand to the handling device. It will be beneficial if the end of the fiber strand remaining on the bobbin is rolled/pressed onto the bobbin, or the fiber strand wound thereon, by the gripping roller following cutting of the fiber strand, where the end of the fiber strand involved will still be hot from having been impregnated/coated with the fusible thermoplastic and the rolling/pressing of the end of the fiber strand is preferably such that the handling device is stationary while the bobbin is rotated in order that the gripping roller attached to the handling device will roll smoothly over the end of the fiber strand and press it onto the bobbin. It is preferred that each of the pair of gripping rollers attached to the handling device roll in that manner over the end of the fiber strand in succession, where it will be beneficial if that rolling/pressing onto the bobbin extends over at least half a full rotation of the bobbin, during which the gripping roller or rollers remain in contact with the bobbin or the fiber strand wound thereon. Following that rolling or pressing of the end of the fiber strand onto the bobbin, the handling device is preferably rotated back to a parked position in which the gripping roller or rollers are out of contact with the bobbin. Wipers or applicators may be used instead of gripping rollers.

An exceedingly preferred embodiment of the invention is characterized by the fact that the apparatus is set up for simultaneously accommodating a pair of bobbins and each of them has its own handling device with cutter and laying means. The apparatus is set up such that the fiber strand will be initially wound onto the first bobbin and subsequently wound onto the second bobbin. Finish-wound bobbins will then be replaced by fresh empty bobbins. Thus once the first bobbin has been wound, winding onto the second bobbin will commence, and while that is taking place the first finished bobbin will preferably be replaced by a fresh empty bobbin. According to a preferred embodiment of the invention, the pair of bobbins is arranged coaxially end to end and their respective handling devices are arranged on their outer ends, that is their ends turned away from each other.

Also within the scope of the invention is a method of winding a fiber strand, where the fiber strand, together with the laying device, are initially fed to the first bobbin and the fiber strand is wound onto the first bobbin, the fiber strand is cut upon termination of winding onto the first bobbin and the laying device along with the end of the fiber strand accommodated therein is then swung to the second bobbin and the fiber strand is subsequently wound onto the second bobbin, while the first finished bobbin is replaced by a fresh empty bobbin. The fiber strand is then cut upon termination of winding operations at the second bobbin, and the laying device together with the fiber strand accommodated therein is then shifted back to the empty bobbin. The fiber strand is then wound onto that empty bobbin, while the second, finish-wound, bobbin is replaced by another, empty, bobbin, and the cycle is repeated.

Also within the scope of the invention is the firm clamping of the fiber strand in the brake while the laying device is swung from one bobbin to the other bobbin and back again in order to prevent the end of the fiber strand from slipping out of the laying device and interrupt continuous feeding of the fiber strand during those motions of the laying device. It will be beneficial if that clamping operation and interruption of continuous feeding of the fiber strand takes 3 to 20 seconds, preferably takes 5 to 15 seconds, and most preferably takes 5 to 10 seconds. The invention thus covers interruptions of continuous feeding of fiber strands lasting just a few seconds. Due to those short interruptions, the winding method according to the invention is, on the whole, a discontinuous method, even though winding fiber strands onto individual bobbins (initiation of winding operations and winding fiber strands thereon) is a continuous operation in each case.

The invention is based on the recognition that the apparatus according to the invention and the method according to the invention allow highly reliable winding of fiber strands onto bobbins, while nevertheless, maintaining high operating rates and winding rates. In view thereof, the apparatus according to the invention is relatively simple and fairly simply designed. The apparatus according to the invention and method according to the invention are particularly suited for winding fiber strands that have been impregnated/coated with a relatively rapidly hardening, liquid medium. That apparatus and method are extremely well suited to winding fiber strands that have been impregnated/coated with a fusible thermoplastic. The apparatus according to the invention is preferably employed for winding fiber strands onto plastic bobbins, bobbins fabricated from plastic containers, metallic bobbins, or bobbins fabricated from metallic containers. However, the apparatus according to the invention may also be employed for winding fiber strands onto bobbins fabricated from other materials. The invention is based on the recognition that high average winding rates and reliable winding of fiber strands will not be adversely affected if winding operations are briefly interrupted in order to switch from one bobbin to another or continuous feeding of fiber strands is briefly interrupted in order to firmly clamp fiber strands. On the contrary, the method according to the invention yields a simple, reliable, means of winding fiber strands onto bobbins, while, nevertheless, maintaining surprisingly high operating rates. Also of particular significance is the fact that the apparatus according to the invention allows highly reliably and neatly rolling or pressing of the ends of fiber strands remaining on bobbins onto these bobbins such that their cut trailing ends will be flush with the finished strand/yarn package outer surfaces. A separate apparatus for melting the ends of fiber strands and ironing them onto carriers that is known from the state of the art will no longer be necessary. Compared to the state of the art, additional, time-consuming steps are thus eliminated. In the case of the method according to the invention, no undesired waste originating from fiber strands due to cutting off their ends is generated, which is why no additional apparatus for removing, or disposing of, such waste will be needed. The apparatus according to the invention is thus capable of getting by with just a few processing stages, and is therefore fairly easy to operate and capable of running at high operating rates. Also worth emphasizing is that the apparatus according to the invention is fairly inexpensive to manufacture.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
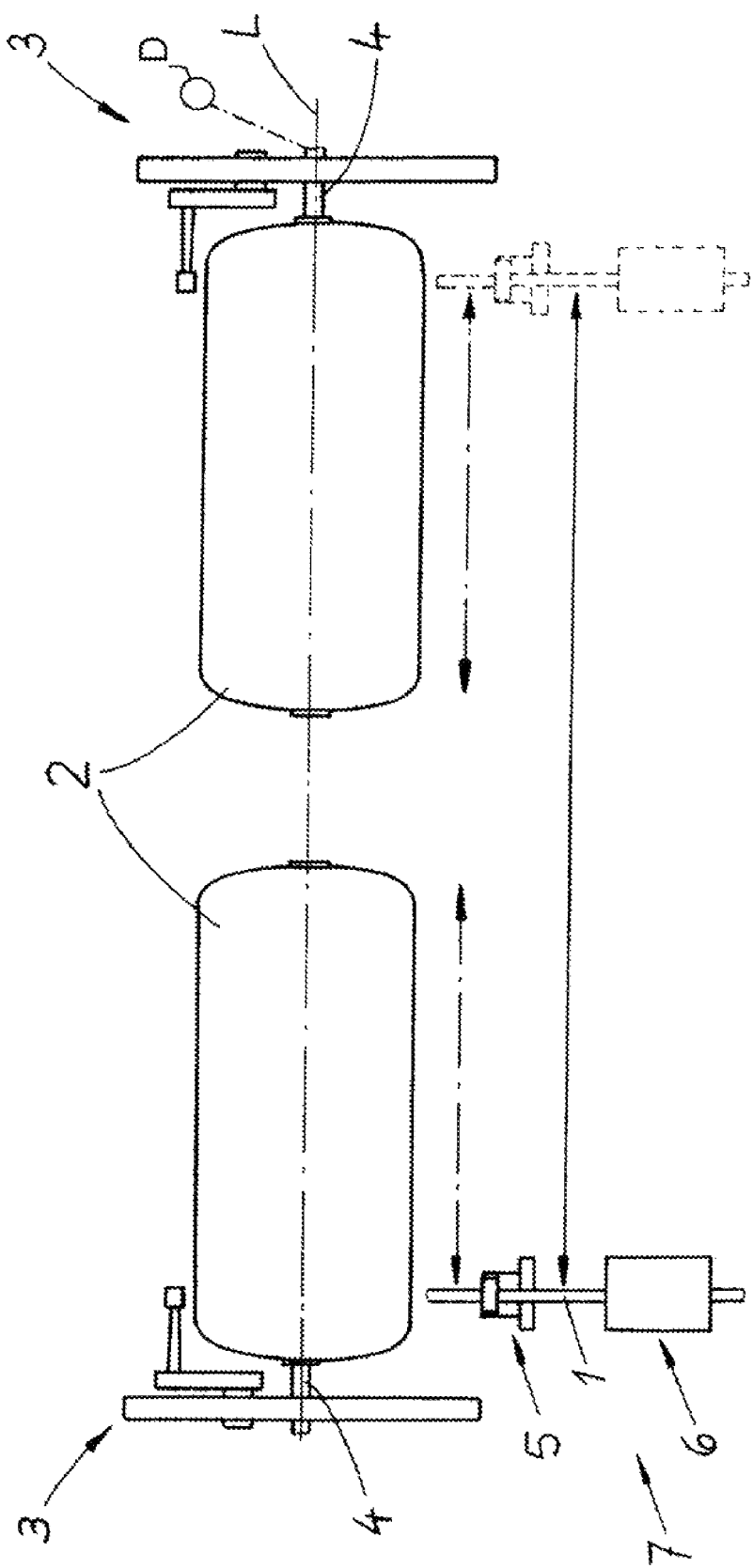
FIG. 1 is a top view of the apparatus according to the invention.

As seen in FIG. 1 an apparatus according to the invention for winding a fiber strand 1 onto bobbins 2. According to a particularly preferred embodiment, and in the case of the sample embodiment, the apparatus is set up for simultaneously accommodating a pair of bobbins 2 (FIG. 1). The bobbins 2 are rotatable about their longitudinal axis L during winding of the fiber strand 1, these axes L being coaxial with the bobbins 3 end-to-end. A handling device 3 that is rotatable about the (extended) longitudinal axis L of the bobbins 2, either independent of the rotation of the respective bobbin 2 involved or synchronously therewith is provided on the outer end of each bobbin 2. The invention covers configuring the bobbins 2 in the form of tubular shells. The bobbins 2 of the illustrated embodiment are made from plastic and have circular cross-sections and essentially cylindrical shapes. Each of the bobbins 2 is supported on a corotating centering shaft 4 on that end thereof facing their associated handling device 3 that preferably passes through the respective handling device 3 in order that the bobbins 2 may be rotated by drives illustrated schematically at D, independently of their associated handling device 3.

FIG. 1 shows that the fiber strand 1 may be fed to a bobbin 2 using a laying device 5. Upstream of the laying device 5 is a brake 6 that can stop advance of the fiber strand 1 in order to interrupt continuous feeding of the fiber strand 1 as explained below. The invention covers a heater H upstream in the travel direction T (FIG. 2) from the brake 6. It will be beneficial if the fiber strand 1 is fed to the heater H in the form of a fiber mixture, where at least one fibrous component of that fiber mixture consists of a thermoplastic that will preferably be continuously melted in the heater H. The above-described fiber mixture will also preferably contain at least one fibrous component that will not be melted. The fiber strand 1 that has been impregnated/coated with the fusible thermoplastic is fed to the bobbins 2. The invention covers the continuous feeding of such fiber strands 1 that have been impregnated/coated with a fusible plastic during the start of winding operations and while they are being wound onto a bobbin 2.

In FIG. 1, double-headed arrows indicate that the assembly 7 consisting of the laying device 5 and brake 6 may be reciprocated in a straight line back and forth parallel to the longitudinal axis L of the bobbins. The fiber strand 1 will initially be wound on the first bobbin 2 shown in FIG. 1 while the assembly 7 consisting of the laying device 5 and brake 6 is swung from one end of the bobbin 2 to the other end of the bobbin 2 and back again, along the dotted, double-headed arrow beneath the bobbin 2 situated on the left. Once the bobbin 2 on the left in FIG. 1 has been finish-wound, the assembly 7 will be swung along a path indicated by the extended, double-headed arrow to the second bobbin 2, that on the right, and the fiber strand 1 wound thereon. Initiation of winding operations preferably commences, and, in the case of the sample embodiment commences, at that end of the bobbin 2 on the right where the handling device 3 is located. Initiation of winding operations on the first bobbin 2, that on the left in FIG. 1, thus also preferably commences at that end thereof where the handling device 3 is located. The dotted, double-headed arrow beneath the bobbin 2 on the right in FIG. 1 indicates that the assembly 7 consisting of the laying device 5 and brake 6 for winding the fiber strand 1 onto the second bobbin 2 may be swung from one end to the other end thereof and back again, where the assembly 7 may also travel along that path many times while winding a fiber strand 1 onto the particular bobbin 2 involved. While a fiber strand 1 is being wound onto the bobbin 2 on the right in FIG. 1, the finish-wound, first, bobbin 2 may be taken off the apparatus and replaced by an empty bobbin 2. Once the second bobbin 2, that on the right, has been finish-wound, the assembly 7 will be swung back to the bobbin 2 on the left and the fiber strand 1 wound thereon, during which the bobbin 2 on the right may be taken off the apparatus and replaced by a fresh empty bobbin 2, and so on. The fiber strand 1 is preferably firmly clamped in the brake 6 in order that continuous feeding of the fiber strand will be interrupted while the assembly 7 is traveling from the bobbin 2 on the left to the other bobbin 2, that on the right, and back. However, continuous feed of the yarn 1 will take place while the assembly 7 is merely reciprocating back and forth along one bobbin 2 while winding a fiber strand 1 thereon, during which time the brake 6 will be deactivated.

Figure 2:
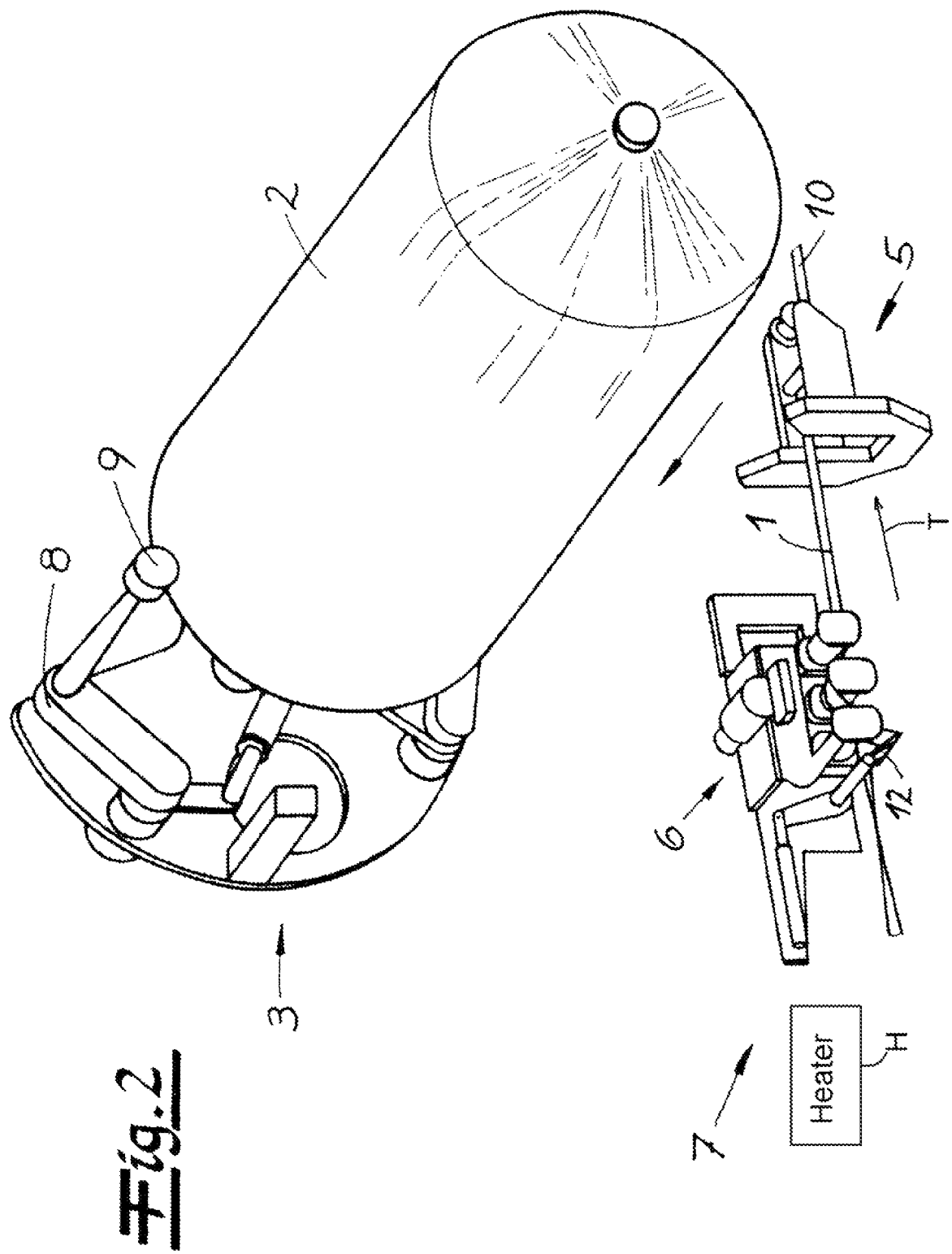
FIGS. 2 through 12 are perspective views of the left-hand part of the apparatus in successive operational positions.

FIGS. 2 through 12 show only the bobbin 2 on the left in FIG. 1 and its associated handling device 3. The winding method according to the invention will be explained based on his left-hand bobbin 2, it being understood that the process is substantially identical for the right-hand bobbin. FIG. 2 shows an operational status that occurs when winding a fiber strand 1 onto the right-hand bobbin 2, which is not shown in FIG. 2, has just been concluded and the assembly 7 consisting of the laying device 5 and brake 6 has been swung back to the left-hand bobbin 2. While in that operational status, the handling device 3 on the left-hand bobbin 2 will be in a parked position shown in FIG. 2, in which position the handling device 3 will be stationary and no rotation of the handling device 3 occurs. A pair of gripping rollers 9 that are set at a spacing from the surface of the bobbin while the handling device 3 is at the parked position is attached to the handling device 3 by a pair of pivoted arms 8. Only one of the gripping rollers 9 is shown in FIG. 2. The two gripping rollers 9 are diametrically opposite each other relative to the axis L of the bobbin 2. Actuation of the pivoted arms 8 will allow the gripping rollers 9 to be brought into contact with the outer surface of the bobbin 2 or the fiber strand 1 wound thereon.

Figure 3:
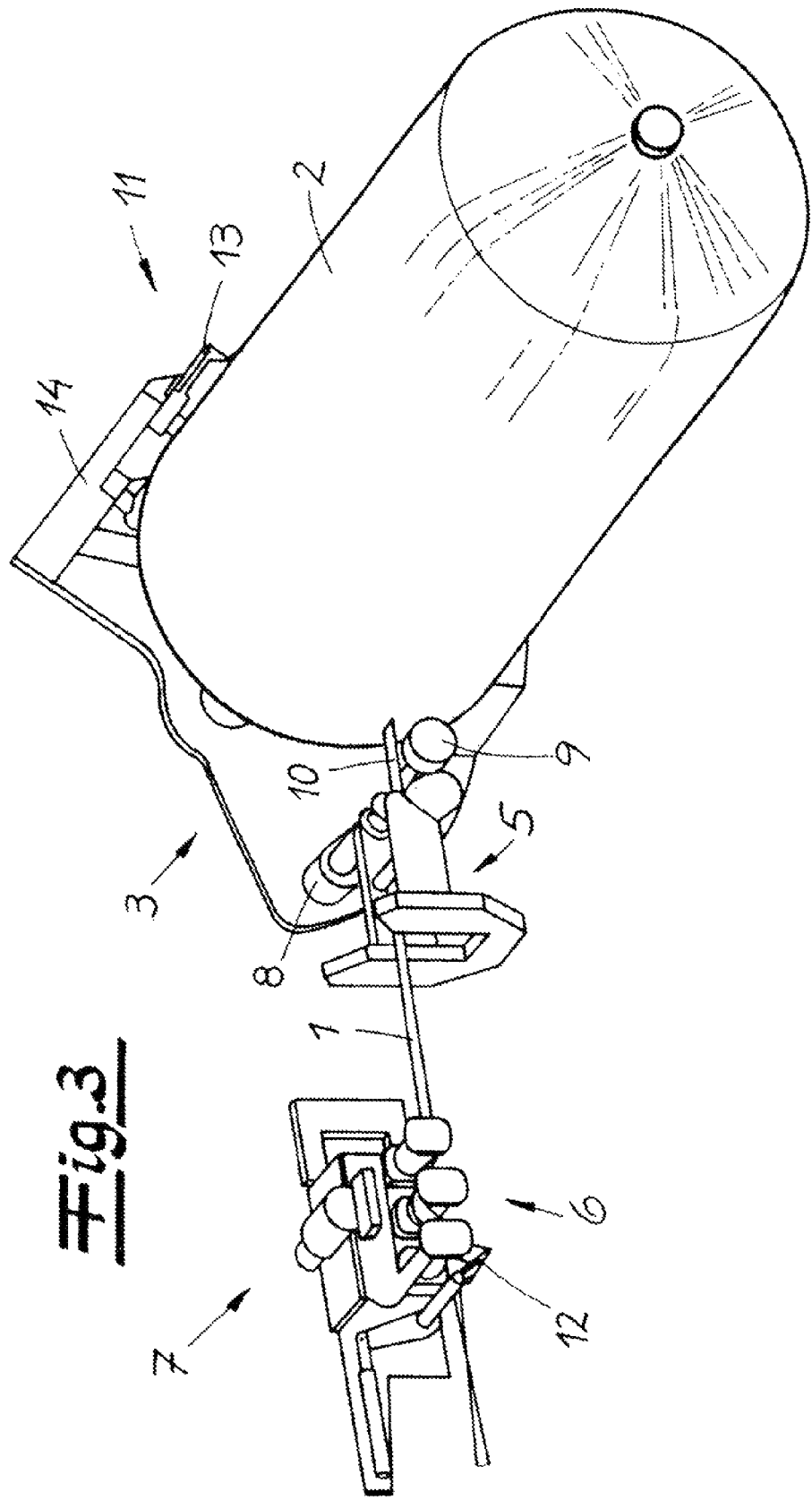

The handling device 3 is rotated to a position for starting winding operations shown in FIG. 3 in order to start winding of the fiber strand onto the left-hand bobbin 2. While in that position, the assembly 7 consisting of the laying device 5 and brake 6 will also be in a position for starting winding operations, in which the end 10 of the fiber strand will be positioned above one of the gripping rollers 9 on the handling device 3.

Figure 4:
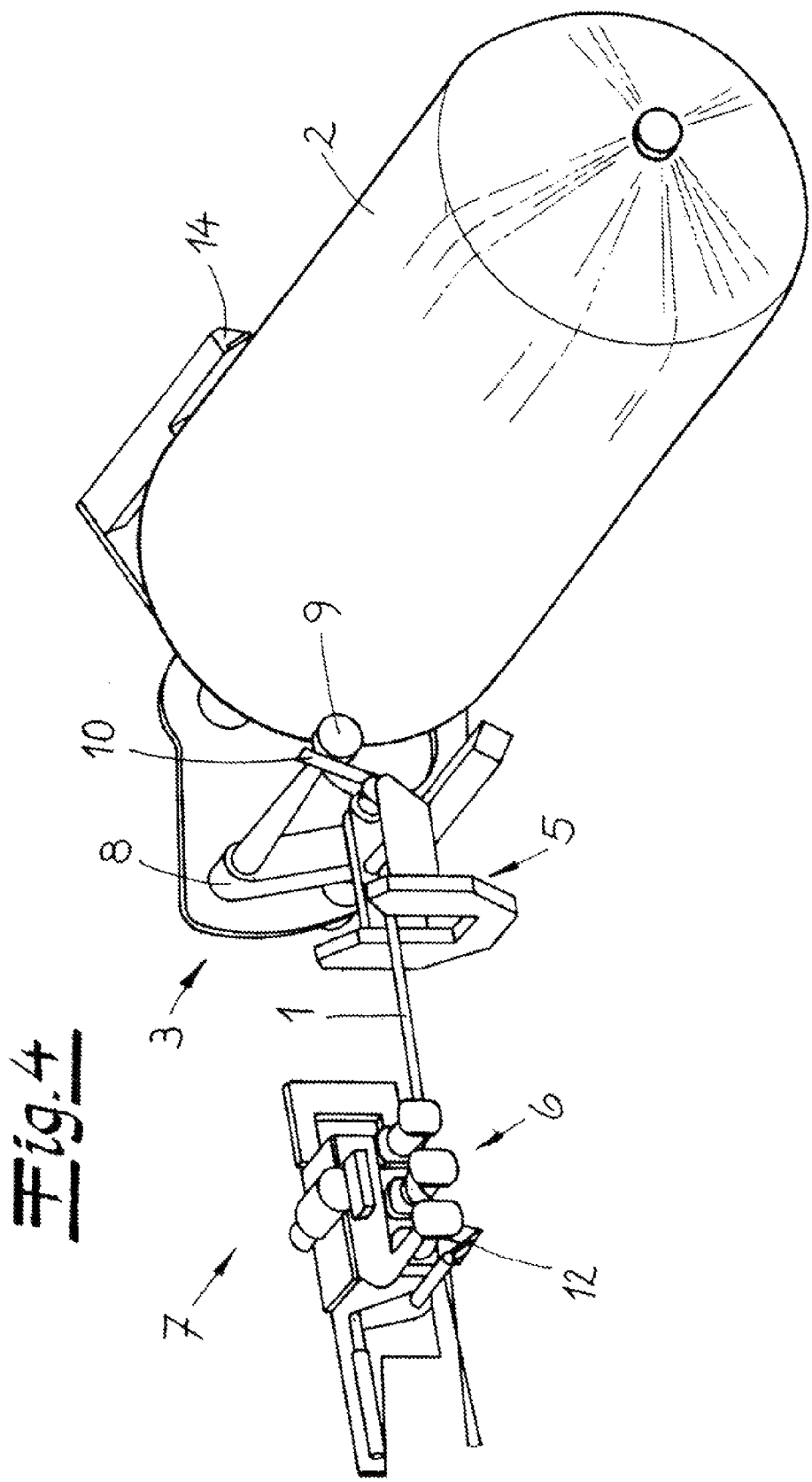
Figure 5:
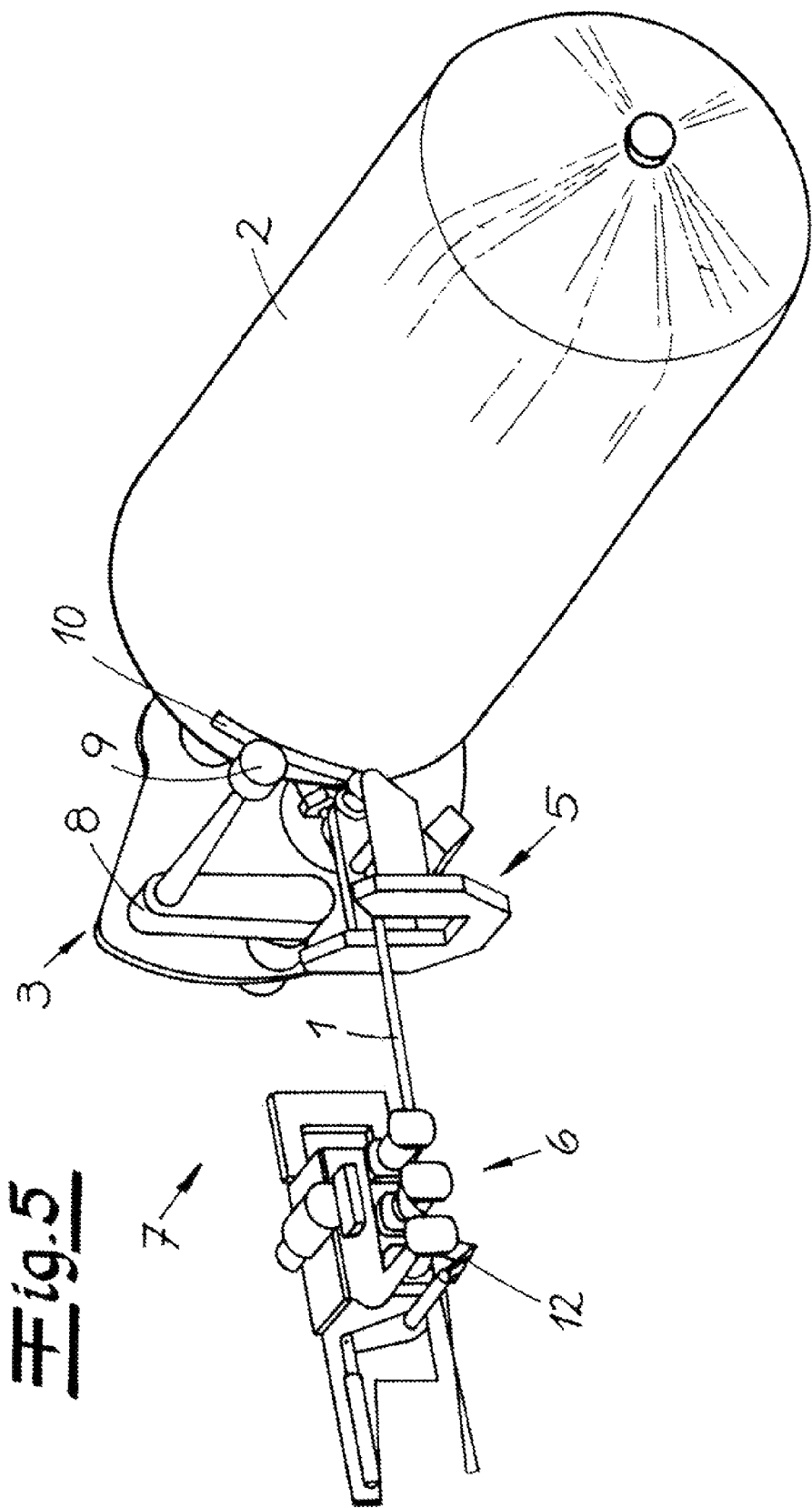

In the position for starting winding operations, the gripping rollers 9 will initially be brought into contact with the outer surface of the bobbin 2, The handling device 3 will then be rotated backward slightly, toward its former, parked position synchronously with rotation of the bobbin 2 in order that the end 10 of the fiber strand will be raised by one of the gripping rollers 9 and bent upward, as shown in FIG. 4. That gripping roller 9 will then move past the tip of the end 10 of the fiber strand 1, toward its previous parked position. The gripping rollers 9 will then be lifted off the outer surface of the bobbin 2 and the handling device 3 will then rotate backward a bit in order that the leading gripping roller 9 will be above the end 10 of the fiber strand. That gripping roller 9 will then be pressed onto the end 10 of the fiber strand by the associated pivoted arm 8 in order that it will be pressed against the bobbin 2. This position for starting winding operations is shown in FIG. 5.

Figure 6:
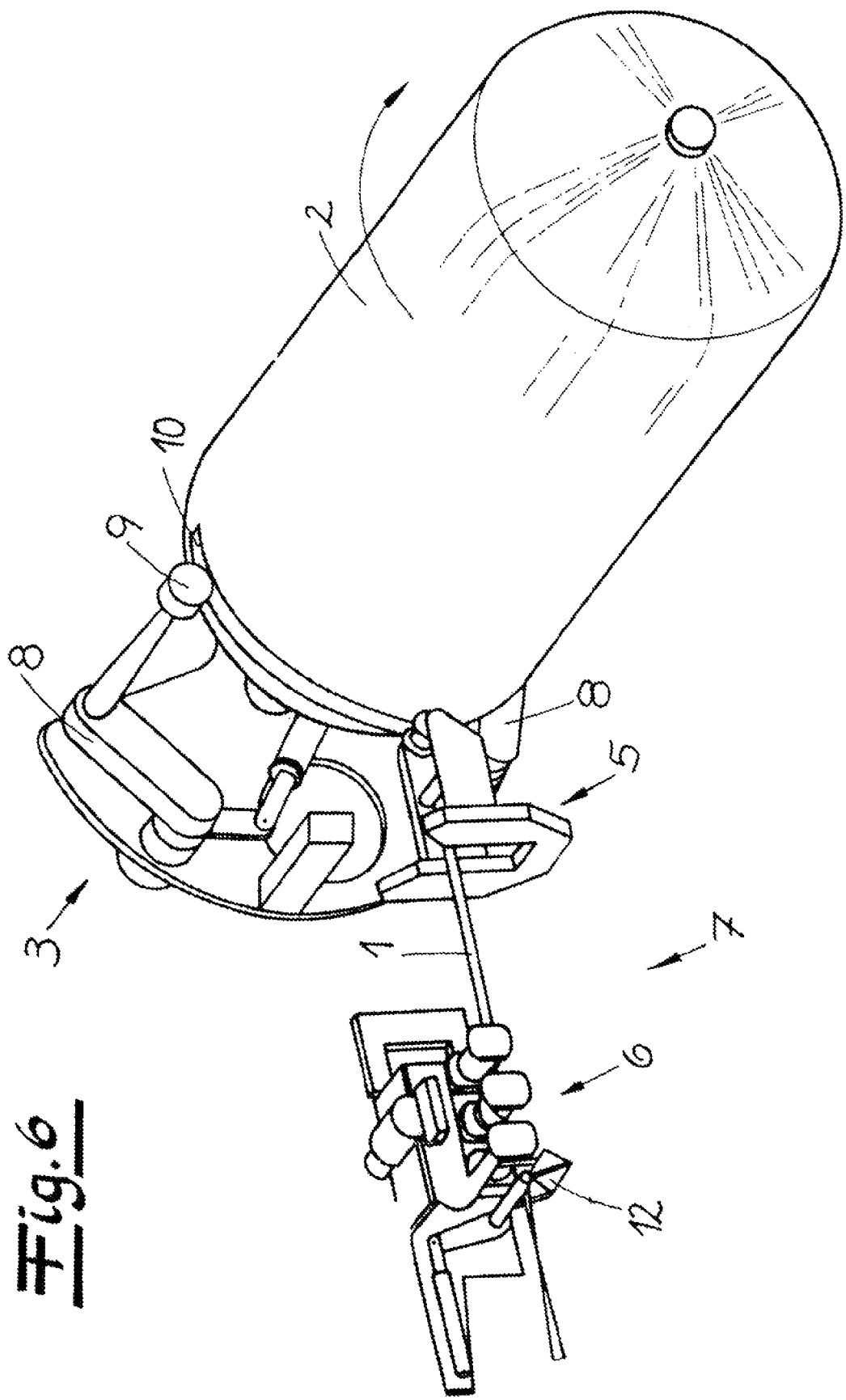

During the further course of starting winding operations, the bobbin 2 and the handling device 3 will rotate synchronously in the direction indicated by the arrow in FIG. 6. During that synchronous rotation, the gripping roller 9 will continue to press the end 10 of the fiber strand against the bobbin 2. The gripping rollers 9 are preferably blocked against rotation in the opposite direction by a one-way clutch. The gripping roller 9 shown in FIG. 6 is able to rotate counter-clockwise, as viewed from the right, only and cannot rotate clockwise so that the end 10 of the fiber strand will remain firmly clamped between the gripping roller 9 and the bobbin 2 and cannot slip out of the gripping roller 9 due to a clockwise rotation of the gripping roller 9. The synchronous rotation of the bobbin 2 and handling device 3 incorporating the gripping roller 9 pressing against the end 10 of the fiber strand preferably continues throughout at least a full revolution of the bobbin 2.

Figure 7:
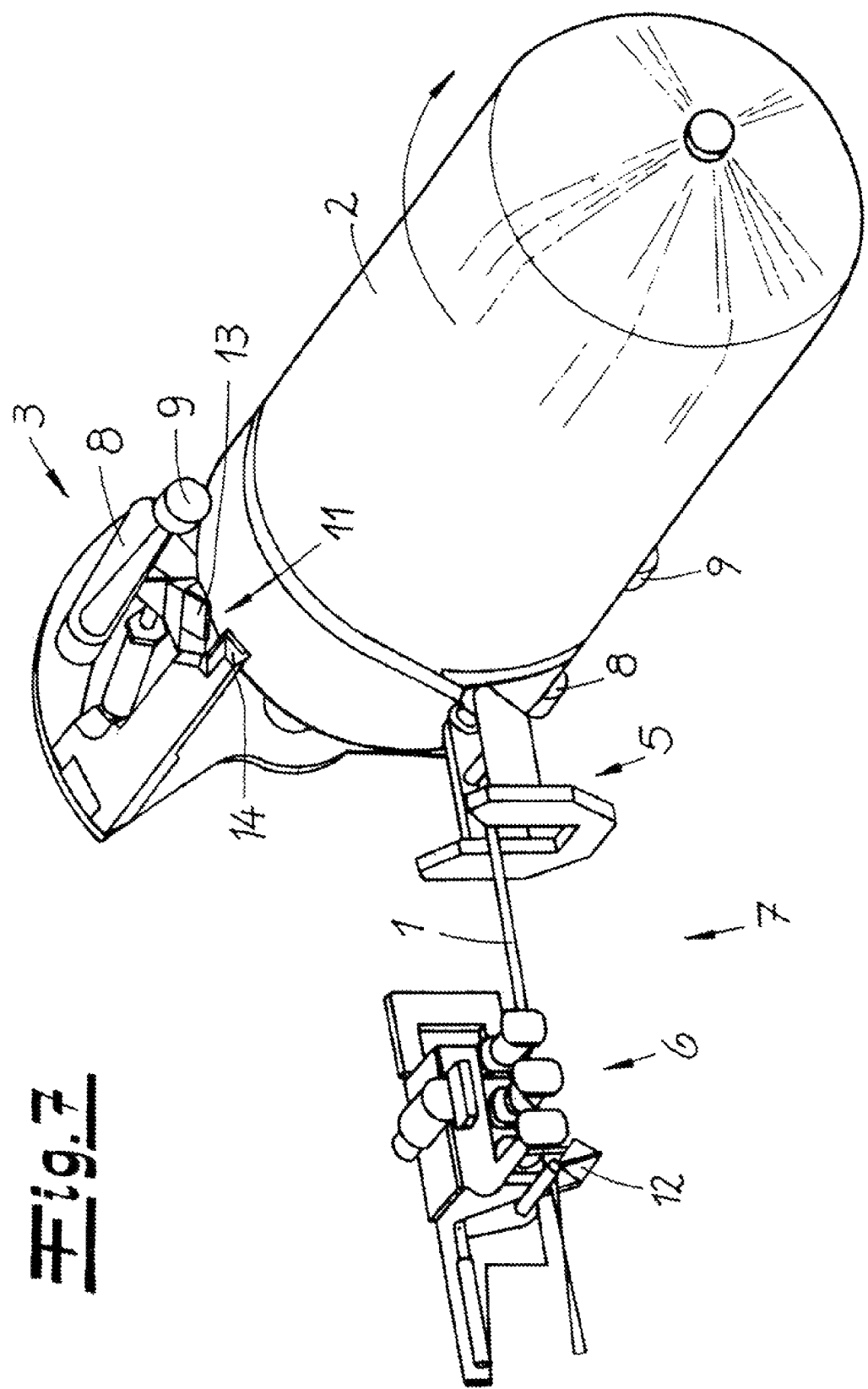

The handling device 3 will then be rotated to the parked position shown in FIG. 7, in which the gripping rollers 9 will be lifted off the bobbin 2 by pivoting of the arms 8 to be out of contact with the bobbin 2 and the fiber strand 1 wound thereon, whereupon the bobbin 2 will continue to continuously rotate in the direction of the arrow shown in FIG. 7. Winding operations will then take place, with the assembly 7 reciprocating between the axially opposite ends of the bobbin 2 to lay succeeding spirals of the strand thereon. This reciprocation of the assembly 7 is repeated numerous times in order that numerous layers of fiber strand may be wound onto the bobbin 2.

Figure 8:
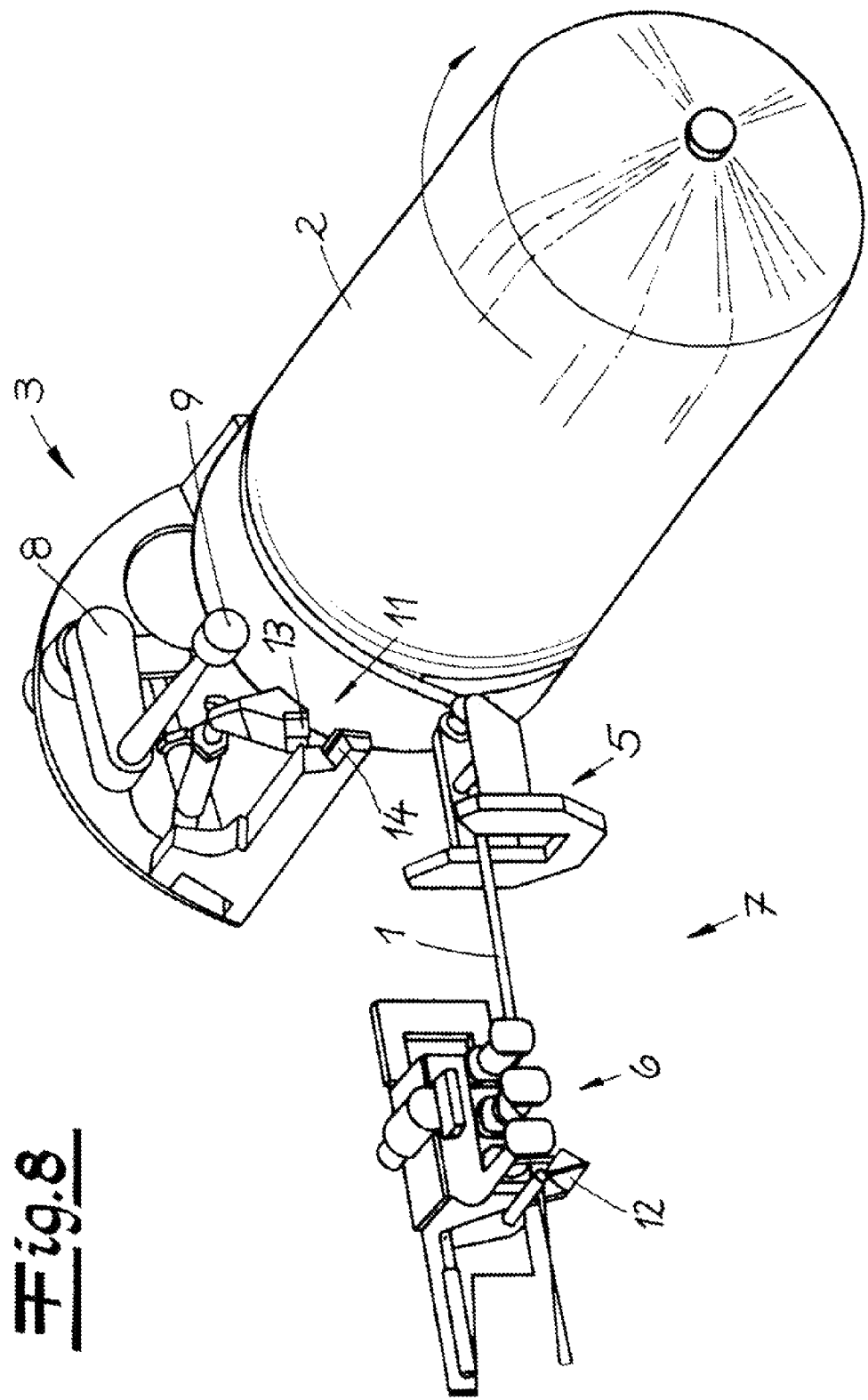
Figure 9:
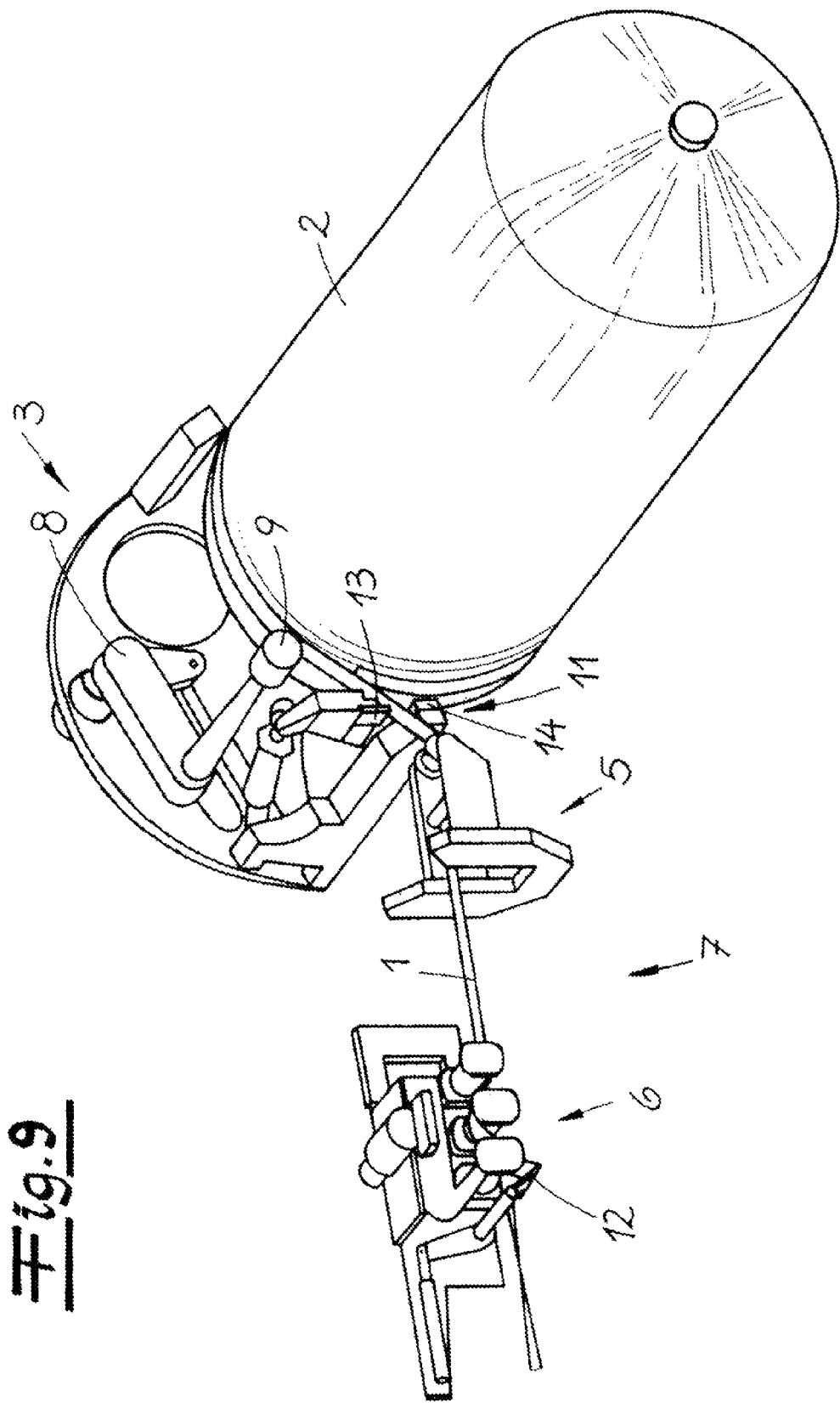

In order to terminate winding operations on the bobbin 2, the fiber strand 1 will have to be cut. A cutter 11 that may be seen in FIG. 7 is attached to the handling device 3 for that purpose. Upon termination of winding operations, the handling device 3 will be rotated out of the parked position shown in FIG. 7 to a cutting position shown in FIG. 9. FIG. 8 shows an intermediate position of the handling device 3 and the assembly 7.

Figure 10:
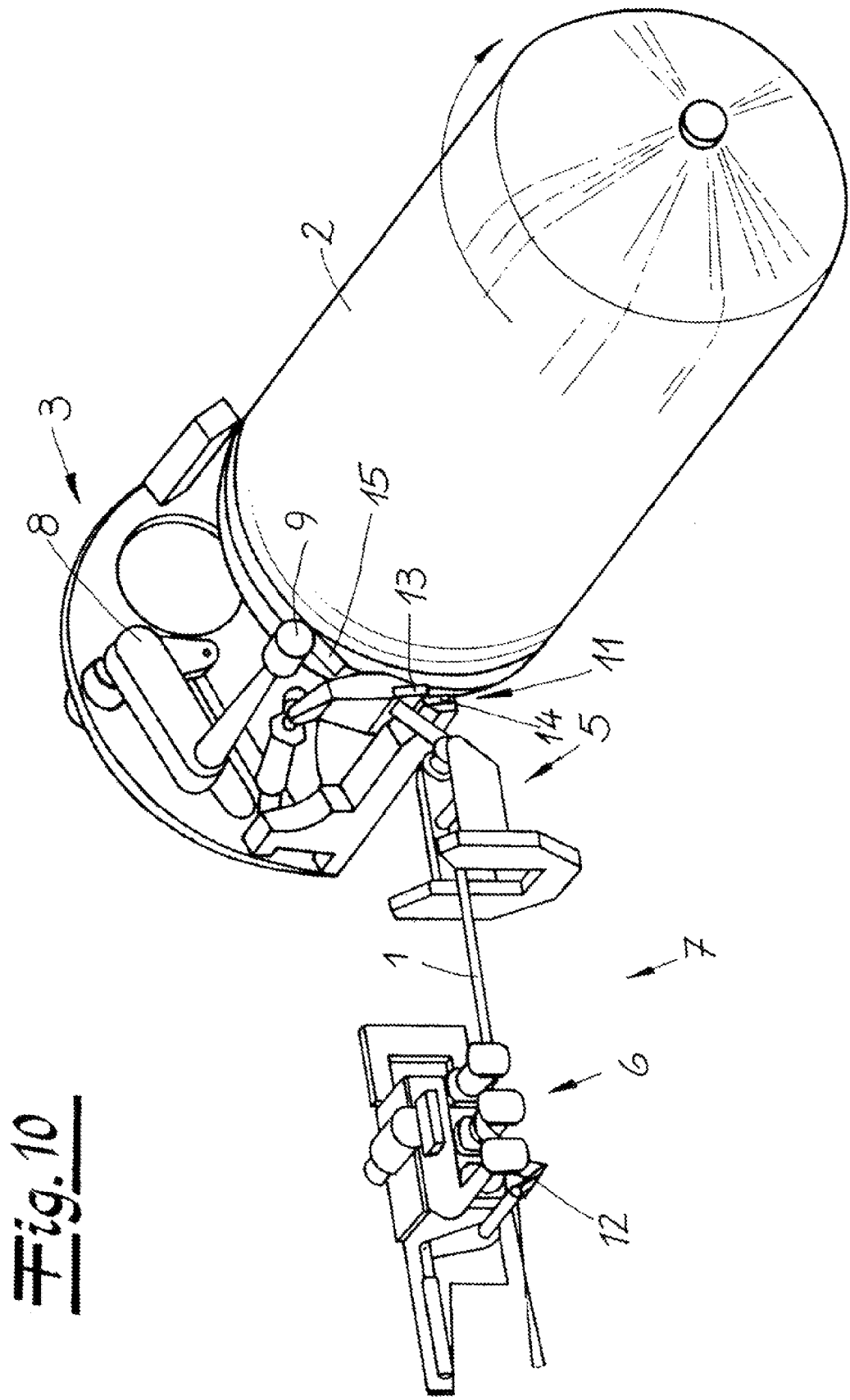
Figure 11:
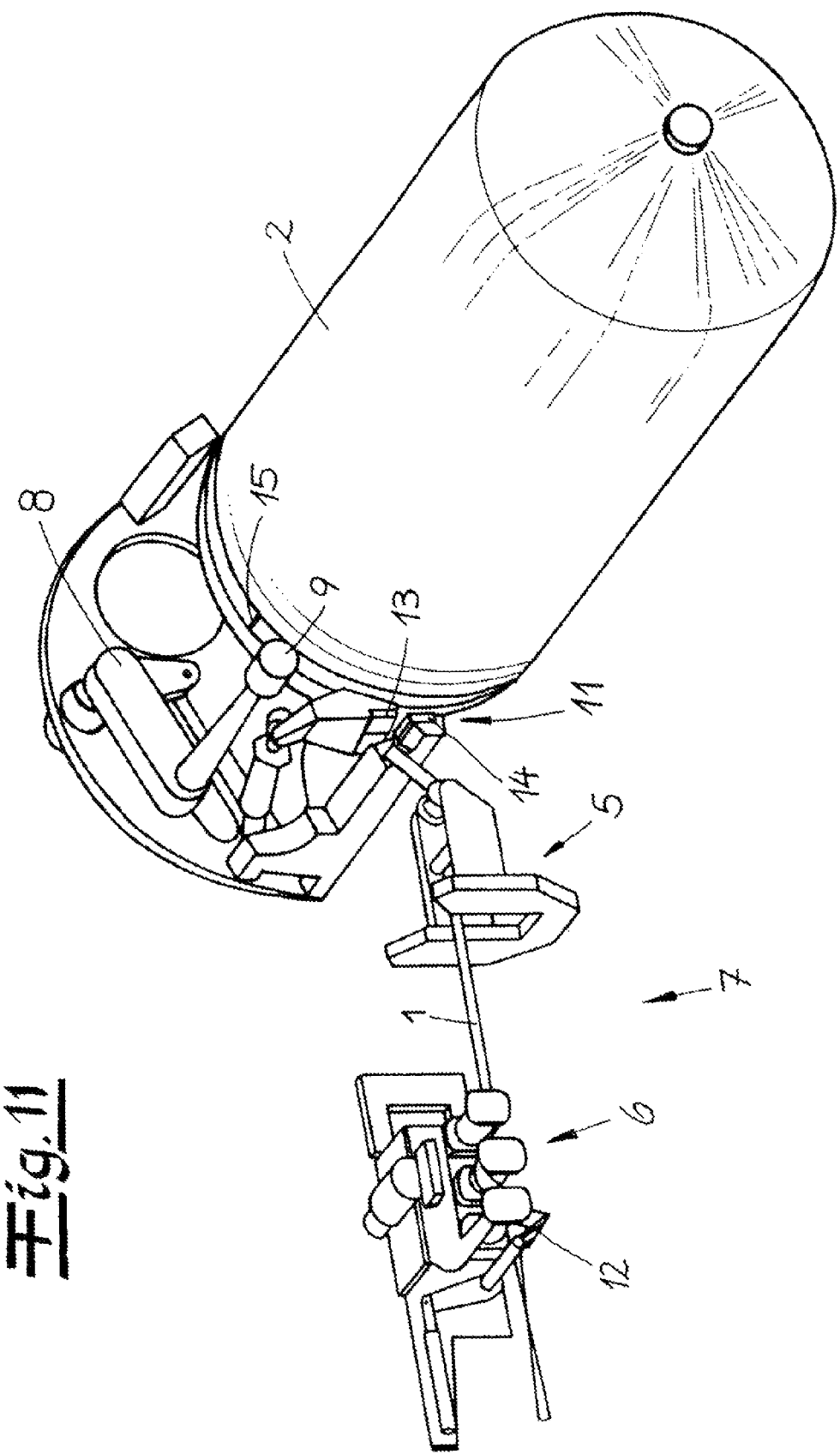

In the cutting position, rotation of the bobbin 2 will be stopped and the fiber strand 1 will be clamped by the brake 6. FIG. 8 shows a clamping element 12 in its preactivation status, while in FIG. 9 it is activated and clamps the fiber strand 1. The fiber strand 1 is now located in front of the stationary, bobbin 2 between a pair of blades 13 and 14 of the cutter 11. In that cutting position, the gripping roller 9 that may be seen above the cutter 11 is pressed against the bobbin 2 and the fiber strand 1 wound onto the bobbin 2 by its pivoted arm 8. The blades 13 and 14 will then close in order to cut the fiber strand 1 (FIG. 10). FIG. 10 further shows the cut fiber strand 1 and the end 15 of the fiber strand remaining on the bobbin 2. The handling device 3 will then initially remain in the cutting position without continuing to rotate, while the bobbin 2 rotates in the direction indicated by the arrow appearing in FIG. 10 and the gripping roller 9 arranged above the cutter 11 rolls over the trailing end 15 of the fiber strand remaining on the bobbin 2 and presses/rolls it onto the bobbin 2, which will reliably press the trailing end 15 of the fiber strand impregnated/coated with fusible thermoplastic, which will still be hot, onto the fiber strand 1 wound onto the bobbin 2 such that it will be flush with them. According to the invention the bobbin 2 undergoes at least half a full rotation at that cutting position of the handling device 3 in order that the trailing gripping roller 9 will preferably also run over the trailing end 15 of the fiber strand and also press it against the bobbin 2. FIG. 11 shows the situation where the leading gripping roller 9 has just run over the trailing end 15 of the fiber strand and pressed it against the bobbin 2, as described above.

Figure 12:
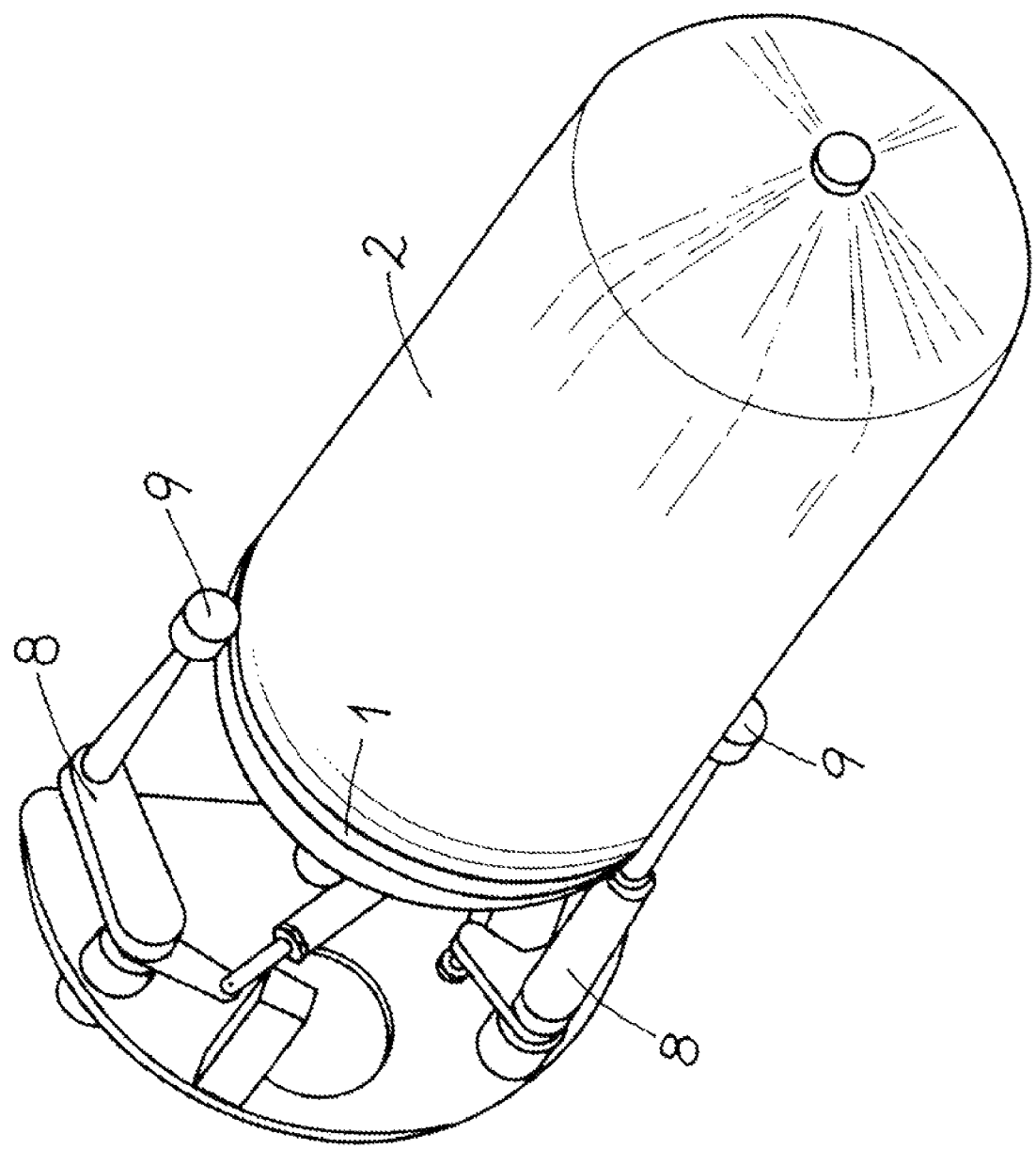

Following that pressing of the trailing end 15 of the fiber strand against the bobbin 2, the handling device 3 returns to a parked position, in which the gripping rollers 9 are brought out of contact with the bobbin 2 and the fiber strand 1 wound onto the bobbin 2 by the pivoted arms 8. That parked position is shown in FIG. 12. Once that parked position has been reached, rotation of the bobbin 2 will preferably also be halted. The assembly 7 consisting of the handling device 5 and brake 6 will be preferably swung to the second bobbin 2, that on the right in FIG. 1, on which winding operations will then take place, starting at that end of the bobbin 2 where the handling device 3 is located, following cutting of the fiber strand 1, and preferably during pressing of the trailing end 15 of the fiber strand. Winding the fiber strand 1 onto that second bobbin 2 will then take place. While it is being wound onto the second bobbin 2, the full left-hand bobbin 2 will be replaced with another, empty, bobbin 2. The cycle can then be repeated once the right-hand bobbin is full.

I claim:

1. An apparatus for winding a fiber strand onto a bobbin having a longitudinal axis, the apparatus comprising:
    a support holding the bobbin for rotation about the longitudinal axis;
    supply means for feeding the fiber strand in a travel direction generally radially or tangentially to the bobbin;
    means for rotating the bobbin about the longitudinal axis and for, when a fiber strand is engaged with the bobbin, winding the fiber strand onto the bobbin;
    a handling device rotatable about the longitudinal axis adjacent the bobbin;
    laying means on the handling device for at a start of a winding operation moving into a predetermined angular position and pressing a leading end of the fiber strand against the bobbin; and
    cutting means on the handling device for at an end of a winding operation cutting the fiber strand and thereby forming a trailing end attached to the bobbin and a new leading end.

2. The winding apparatus defined in claim 1 wherein the fibers are at least partially formed by a fusible thermoplastic, the apparatus further comprising:
    heating means upstream in the direction from the handling device for at least partially fusing the thermoplastic of the fiber strand.

3. The winding apparatus defined in claim 1 wherein the supply means includes a strand guide adjacent the bobbin.

4. The winding apparatus defined in claim 1 wherein the laying means is provided with a roller that can press the leading end of the strand against the bobbin at the start of the winding operation.

5. The winding apparatus defined in claim 4 wherein the roller of the laying means rotates synchronously with the bobbin at the start of the winding operation.

6. The winding apparatus defined in claim 4 wherein the handling device is shiftable into a parked position with the roller wholly out of contact with the strand and the bobbin.

7. The winding apparatus defined in claim 6 wherein at the end of the winding operation the handling device moves out of the parked position into a cutting position in which the cutting means is operable.

8. The winding apparatus defined in claim 4 wherein the roller at the end of the winding operation presses the trailing end of the strand against the strand wound on the bobbin.

9. The winding apparatus defined in claim 1, further comprising a second such bobbin and laying device adjacent with the first-mentioned bobbin, the laying device being shiftable between the first bobbin and the second bobbin, whereby when the first bobbin is full the supply means can wind the strand on the second bobbin while the full first bobbin is switched with an empty bobbin, and vice versa.

10. The winding apparatus defined in claim 9 wherein the first and second bobbins are arranged coaxially and their respective laying devices are on outer ends of the bobbins.

11. A method of operating an apparatus for winding a fiber strand onto bobbins having longitudinal axes, the apparatus comprising:
    two supports holding respective bobbins for rotation about the respective axis;
    supply means for feeding the fiber strand in a travel direction generally radially or tangentially to the bobbins;
    means for rotating the bobbin about the respective longitudinal axes and for, when a fiber strand is engaged with the bobbin, winding the fiber strand onto the respective bobbin;
    respective handling devices rotatable about the axis adjacent the bobbins;
    laying means on the handling device for at a start of a winding operation moving into a predetermined angular position and pressing a leading end of the fiber strand against the bobbin; and
    cutting means on the handling device for at an end of a winding operation cutting the fiber strand and thereby forming a trailing end attached to the bobbin and a new leading end, the method comprising the steps of sequentially:
    a) pressing a leading end of the strand against one of the bobbins while rotating the one bobbin to wind the strand thereon;
    b) thereafter rotating the one bobbin while reciprocating the feed means adjacent the one bobbin to wind layers of the strand thereon;
    c) when the one bobbin is full, cutting the strand to form a trailing end connected to the one bobbin and a new leading end;
    d) shifting the feed means to the other bobbin and repeating steps a) through c) with the other bobbin while replacing the full one bobbin with a fresh empty bobbin.

12. The method defined in claim 11, further comprising the step of
    braking the strand and thereby arresting feed thereof while the feed means is shifted between bobbins.

* * * * *